3,249,132
BATTERY ACID FILLING APPARATUS
William J. Eberle, Dallas, Tex., assignor, by mesne assignments, to Vitalic Battery Co., Inc., Dallas, Tex., a corporation of New York
Filed May 14, 1963, Ser. No. 280,773
2 Claims. (Cl. 141—59)

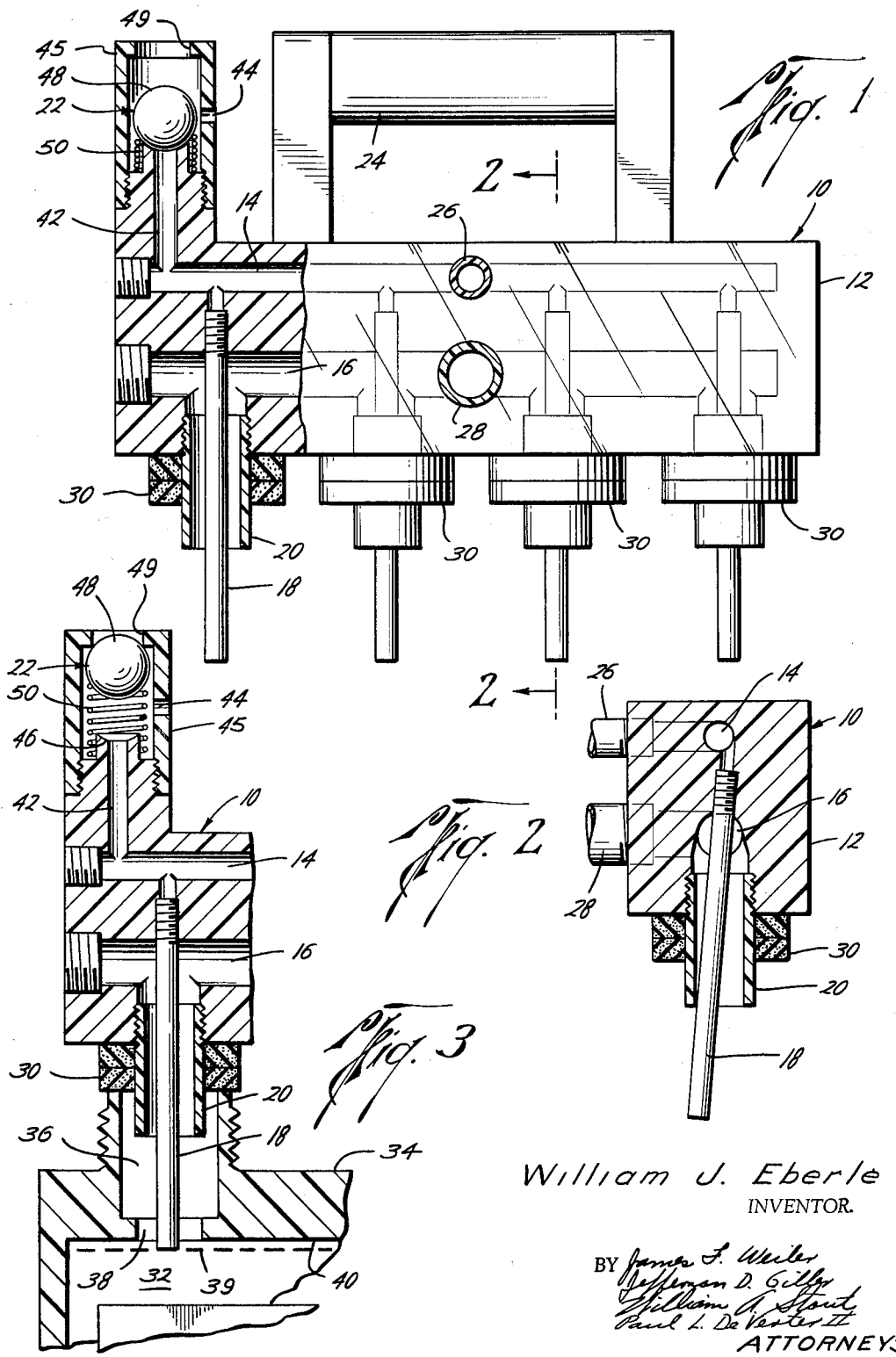

The present invention relates to a battery acid filling apparatus, and more particularly, relates to an apparatus for quickly and automatically filling a plurality of battery cells with acid.

Generally, it is old to fill a battery with acid as shown by Patent No. 1,956,968 by the use of a vacuum being drawn through a vacuum manifold which in turn draws acid through an acid manifold and to acid feed lines where the acid is allowed to drop into the battery cells. However, it has been found that the openings on the battery cells are frequently not perfectly aligned and the acid filling lines could not be satisfactorily inserted into the cell openings for filling the battery cells. In addition, frequently, in manual operation of the acid filling apparatus, acid is drawn from the acid manifold and into the vacuum manifold and out into the vacuum pump which becomes damaged by the acid. The present invention is directed to various improvements in a battery acid filler to overcome these disadvantages.

It is therefore one object of the present invention to provide a battery acid filler which will automatically stop the flow of acid into the battery cells when the acid level in the cells reaches a predetermined level.

A still further feature of the present invention is the provision of a battery acid filler wherein the vacuum air lines extend through the acid feeding lines and extend to a point below the acid lines whereby the smaller air lines are the only ones extending down into the battery cell openings so that the apparatus can fill batteries even though the cell openings in some batteries may not be perfectly aligned.

Yet a still further object of the present invention is the provision of a battery acid filler wherein the vacuum lines pass through the acid feeding lines but are inclined relative to the acid feeding lines to prevent circulation of the acid along the outside of the air lines and upwardly through the air lines without dropping into the battery cells.

Yet a still further object of the present invention is the provision of a manually actuated valve which closes a passageway between the vacuum manifold and the atmosphere to cause the vacuum to draw in acid into the acid lines and fall into the battery cells, but which will automatically reset when the battery fills to a predetermined level.

Other and further objects, features and advantages will be apparent from the following description of a presently preferred embodiment, given for the purpose of disclosure, and taken in conjunction with the accompanying drawing, where like character references designate like parts throughout the several views, and where, FIGURE 1 is an elevational view, partly in cross-section, illustrating a battery acid filling apparatus of the present invention with the automatic valve in position to cause acid to be fed through the apparatus, FIGURE 2 is a cross-sectional view taken along the line 2—2 of FIGURE 1, and FIGURE 3 is a fragmentary cross-sectional view showing the automatic resetting valve mechanism of the present invention in position after resetting.

Referring now to the drawing, the numeral 10 generally designates a battery acid filler of the present invention and generally includes a body 12, a vacuum manifold 14, an acid manifold 16, a plurality of vacuum air lines 18 which are connected to the air manifold 14, a plurality of acid feeder lines 20 which are connected to the acid manifold 16, and an automatic valve assembly 22.

The body 12 is preferably made of a clear plastic such as lucite for quickly and easily locating and repairing stoppages which may occur in the lines of flow and which may therefore prevent proper filling of the battery cells. In addition, a handle 24 may be suitably connected to the body 12 for conveniently handling the apparatus 10. Vacuum manifold 14 is connected to a suitable line or conduit 26 for connection to an air pump (not shown) for creating a suitable vacuum for drawing the acid into the apparatus and into the battery cells as will be more fully described hereinafter. Similarly, the acid manifold 16 is connected to an acid supply line or conduit 28 which in turn is connected to a suitable acid supply (not shown) whereby when suction or vacuum is applied to the acid manifold 16 it will draw acid from line 28 into the manifold 16.

Of course, the apparatus 10 may have as many acid feed lines 20 and air suction lines 18 as are desired and this usually depends upon the number of cells in the battery to be filled. A sealing pad 30, preferably made of a resilient material such as rubber, is provided about the exterior feeding lines 20 so that when lines 18 and 20 are inserted into the top of a battery cell 32, as best seen in FIGURE 3, air communication from the atmosphere to the battery cell 32 will be blocked so that the vacuum line will pull in acid through the acid feed lines 20.

Generally, the above described components of a battery acid filler is old. The present invention is specifically directed to providing several improved features which materially assist and improve the acid filling operation of the cells in a battery. First, it is to be noted that the air vacuum lines 18 are smaller than the acid lines 20, that they extend through the acid lines 20, and that they terminate at a point below the termination or the bottom end of the acid feed lines 20.

Referring particularly to FIGURE 3, the apparatus 10 is shown in position filling one cell 32 of a battery 34, which cell includes an opening 36 and throat 38. While theoretically batteries when they are manufactured are uniform, it has been frequently found when filling batteries that the throats 38 on different batteries would not be accurately aligned and the normal battery filling apparatus would not fit either in the cell openings or the throat 38, and the battery cells could not be simultaneously filled because of this misalignment. However, in the present invention only the small inside air line 18 need extend down into the throat 38 of the cell 32 and because of this the lines 18 will still be able to coact with the throats 38 even in the event that the battery cells are slightly out of line. Thus, the air vacuum lines 18 extend downwardly to a position as shown by the dotted line 39 in FIGURE 3 which is slightly below the top 40 of the battery cell. Thus, when the acid is drawn from the acid manifold 16 and down the acid fill lines 20, the acid will drop into the battery cell 32. When the acid rises to the dotted line at the end of the air vacuum line 18 the vacuum will be discontinued, as more fully described hereinafter, stopping the pumping of acid from the acid lines 20 but the remainder of the acid in the manifold 16 and in the lines 20 will drain to fill the battery cells 32 up to the desired point of fill such as the top 40 of the cells. However, the structure of having only the smaller central line 18 extending down into the throat 38 of the cell 32 allows the apparatus 10 to be used on a production line where one battery after another is being filled with acid in spite of the fact that the throats 38 may not all be accurately aligned.

Referring now to FIGURE 2, it is noted that preferably the vacuum air line 18 is inclined with reference to the acid feed line 20 so that the lines are not coaxially spaced. The reason for this is that if the lines are coaxially spaced the acid may flow downward around the outside of the air line 18 and up the interior of the air line 18 without dropping into the battery cell as it is intended to do. The fact that the air line 18 terminates at a position below the end of the acid line 20 also aids in accentuating the angle of incline between the lines 18 and 20 which assists in preventing this undesirable back flow with the disadvantages of not only failing to fill the cells but flowing acid to and damaging the vacuum pump (not shown).

Referring now to FIGURES 1 and 3, the structure and operation of the valve assembly 22 is best seen. A passageway 42 is provided which is connected to the vacuum manifold 14. As best seen in FIGURE 3, passageway 42 is normally in communication with the atmosphere through an opening 44 in a valve retaining structure 45. On passageway 42 a valve seat 46 is provided on which a valve member such as ball 48 is provided to seat thereon thereby closing the communication of the passageway 42 with the atmosphere. A spring 50 is provided which yieldably urges the ball 48 away from the seat 46. The retaining structure 45 serves to align and hold the ball 48. An opening 49 in the retainer 45 provides a passageway for manually actuating the valve assembly 22 by pressing the ball 48 against the seat 46. Thus, while an air pump (not shown) may maintain a vacuum in the vacuum manifold 14 at all times, with the valve member 48 in the up position as shown in FIGURE 3, air will be pumped in through the opening 44 and through the passageway 42 to the manifold 14 without drawing acid in through the manifold 16 and acid lines 20. However, when the ball 48 is seated on the valve seat 46 the spring 50 will be overcome and the atmospheric air will be shut off from the vacuum manifold 14 thereby causing the manifold 14 to draw air through the air lines 18 and cells 32 placing a suction on the acid lines 20 and acid manifold 16 to draw acid into the line 20 where it may drop into the cells 32. The spring 50 is of such a size and strength that while yieldably urging the ball 48 away from the seat 46 the vacuum will hold the ball 48 on the seat 46 and overcome the spring 50 when the ball 48 is manually set thereon. However, as soon as the acid in the cell 32 reaches the level of the dotted line 39 shown in FIGURE 3, the air line 18 begins to suck acid into the air line 18 and to the air manifold 14. The effect of the acid entering the air manifold 14 acts to reduce the vacuum pull on the ball 48 sufficiently to allow the spring 50 to overcome the lessened vacuum and remove the ball 48 from the valve seat 46. This resets the valve assembly 22 to the position shown in FIGURE 3 and automatically allows the atmospheric air to enter into the passageway 42 and air manifold 14 and stops the action of drawing acid into the acid manifold 16 and merely allows the acid remaining in the acid manifold 16, and the lines 18 and 20 to drain into the battery cell 32 and up to the desired fill level. Of course, the strength and size of the spring 50 must be of a suitable tension to provide this automatic resetting action which will depend upon the strength of the vacuum and the size and weight of the valve member 48.

In use, the air vacuum manifold 14 is generally connected by conduit 26 to a suitable air pump (not shown) which provides a vacuum suction on the manifold 14. Similarly, acid manifold 16 is in fluid communication with an acid supply (not shown) by means of the conduit 28. Thus, the apparatus 10 of the present invention can be utilized for filling the batteries on a production line merely by taking the handle 24 and inserting the lines 18 and 20 into the openings 36 of the cells 32 of the battery 34 and manually actuating the ball 48 to start the flow of acid. Because of the fact that only the smaller lines 18 extend down into the throat 38 of the battery cells, the apparatus 10 will coact with and fit into the battery cells in spite of the fact that they may be slightly misaligned.

Normally, valve assembly 22 is in position as shown in FIGURE 3 with the valve member or ball 48 being held away from the valve seat by the spring 50 whereby atmospheric air enters the opening 44, passes through the passageway 42 and into the vacuum manifold 14 thereby preventing any substantial vacuum force from being applied to the acid manifold 16. However, after the apparatus has been placed on a battery with the lines 18 and 20 positioned on the cells and the sealing pads 30 closing the openings 36 at the top of the cells, the ball 48 may be manually actuated through opening 49 and seated on the valve seat 46. This causes a suction to be applied to the air lines 18, to the cells 32, through the acid feed lines 20 and to the acid manifold 16 thereby drawing acid to the manifold 16, and into the lines 20 where the acid will flow into the battery cells 32. This process continues until the acid level in the cells 32 reach the lower end of the air lines 18 at which time the air lines will pick up the acid and start to deliver it to the air manifold 14. This automatically stops the vacuum action on the acid manifold 16 as the effect of the acid entering the air manifold 14 causes a turbulence to break up the vacuum pull on the ball 48, which has been held in place by the vacuum, and allows the spring 50 to move the ball 48 away from the valve seat 46 thereby again opening the passageway 42 to the atmosphere through the opening 44. This stops the suction action on the acid manifold 16 and reestablishes the flow of air to the air manifold from passageway 42. The remaining acid in the manifold 16 and lines 18 and 20 drain into the cells 32 and fill the cells 32 to the desired level, say at the top 40 of the cells.

The advantage of the automatic valve assembly 22 lies in the fact that the apparatus 10 need not be held by the operator after the apparatus has been placed in position and the ball 48 actuated. Since the valve 22 releases without any action by the operator, the apparatus 10 may remain on the battery 34 until it has completely drained and will avoid dripping acid on the battery.

In addition, as best seen in FIGURE 2, the effect of inclining air lines 18 relative to the acid lines 20 prevents coaxial alignment of these lines with the possibility that the acid can flow down the outer periphery of the air line 18 and up into the interior of the line 18 without flowing into the battery cells 32 as in the normal operation. Of course, if any of these lines become clogged and thus inaccurately fill the battery cells, the process of filling may be noted through the transparent plastic body 12 and the blockage quickly cleared.

The present invention, therefore, is well suited and adapted to carry out the objects and attain the ends and advantages mentioned as well as others inherent therein. While a presently preferred embodiment of the present invention is given for the purpose of disclosure, numerous changes in the details of construction, arrangement of parts may be made which will readily suggest themselves to those skilled in the art and which are encompassed within the spirit of the invention and the scope of the appended claims.

What is claimed is:

1. In an apparatus for filling a plurality of battery cells with acid and having an acid manifold, a vacuum manifold, and a passageway from the vacuum manifold to the atmosphere whereby acid is drawn through the acid manifold by the vacuum when the passageway from the vacuum manifold to the atmosphere is closed, the improvement comprising, a plurality of acid lines having first and second ends, the first ends of which are connected to the acid manifold and the second ends of which are positioned below the acid manifold and spaced from each other in position for insertion into the top of the cells of the battery to be filled, a plurality of vacuum lines having first and second ends, the first ends of which are connected to the vacuum manifold, the second ends of which are positioned below the second ends of said acid lines proximate the point at which it is desired to fill the cells when the acid and vacuum lines are inserted into the cells, said vacuum lines being smaller than said acid lines and each of said vacuum lines extending through the interior of one of the acid lines, a sealing pad surrounding each of the acid lines above the second ends of said acid lines for sealing the battery cells from the atmosphere when the acid and vacuum lines are inserted into the cells, a passageway extending from the vacuum manifold to the atmosphere which when opened causes any vacuum applied to the vacuum manifold to draw in atmospheric air instead of acid from the acid manifold, a valve seat in the passageway, a valve member adapted to seat on the valve seat thereby closing the passageway, and spring means yieldably urging said valve member away from the seat, said spring means sized to be overcome by the vacuum applied to the vacuum manifold by the valve member when the valve member is placed on the seat but to automatically move the valve member away from the seat when acid is pulled into the vacuum manifold reducing the vacuum pull on the valve member.

2. The invention of claim 1 wherein the vacuum lines are inclined relative to the acid lines to prevent circulation of the acid from the outside to the inside of the air lines without flowing into the cells.

References Cited by the Examiner
UNITED STATES PATENTS

| | | | |
|---|---|---|---|
| 1,956,968 | 5/1934 | Altmayer et al. | 141—58 |
| 2,784,748 | 3/1957 | Eichenlaub | 141—59 X |
| 2,882,935 | 4/1959 | Scharringhausen | 141—43 |
| 3,067,785 | 12/1962 | Meyer | 141—57 |

LAVERNE D. GEIGER, *Primary Examiner.*

E. EARLS, *Assistant Examiner.*